(12) United States Patent
Maciver et al.

(10) Patent No.: US 12,393,401 B2
(45) Date of Patent: Aug. 19, 2025

(54) SYSTEMS AND METHODS FOR IMPROVING EFFICIENCY AND CONTROL COMPLIANCE ACROSS SOFTWARE DEVELOPMENT LIFE CYCLES USING DOMAIN-SPECIFIC CONTROLS

(71) Applicant: JPMORGAN CHASE BANK, N.A., New York, NY (US)

(72) Inventors: Peter Maciver, Milngavie (GB); Sean Moran, London (GB); Brad Spiers, Bedminster, NJ (US); Rob Otter, Witham (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 98 days.

(21) Appl. No.: 18/356,118

(22) Filed: Jul. 20, 2023

(65) Prior Publication Data
US 2024/0028302 A1    Jan. 25, 2024

Related U.S. Application Data

(60) Provisional application No. 63/369,118, filed on Jul. 22, 2022.

(51) Int. Cl.
*G06F 8/10* (2018.01)
(52) U.S. Cl.
CPC ..................... *G06F 8/10* (2013.01)
(58) Field of Classification Search
CPC ........................................................ G06F 8/10
USPC .................................................. 717/120–140
See application file for complete search history.

(56) References Cited

U.S. PATENT DOCUMENTS

| | | | | |
|---|---|---|---|---|
| 6,789,054 B1 * | 9/2004 | Makhlouf | ................. | G06F 8/10 |
| | | | | 703/22 |
| 8,504,405 B2 * | 8/2013 | Miller | ................... | G06Q 10/06 |
| | | | | 705/7.23 |
| 8,677,315 B1 * | 3/2014 | Anderson | ................. | G06F 8/60 |
| | | | | 717/124 |
| 9,122,422 B2 * | 9/2015 | Johnston | ................... | G06F 8/10 |
| 9,992,230 B1 * | 6/2018 | Haverty | ................. | G06F 21/45 |

(Continued)

OTHER PUBLICATIONS

Yau et al., "A Blockchain-based Testing Approach for Collaborative Software Development", IEEE, pp. 1-8 (Year: 2020).*

(Continued)

*Primary Examiner* — Anil Khatri
(74) *Attorney, Agent, or Firm* — GREENBERG TRAURIG LLP

(57) ABSTRACT

Systems and methods for improving efficiency and control compliance across software development life cycles using domain-specific controls are disclosed. In one embodiment, a method may include: (1) receiving, by an analysis and recommendation service computer program, an identification of a domain for code; (2) identifying, by the analysis and recommendation service computer program, rules and/or control patterns for the domain; (3) receiving, by the analysis and recommendation service computer program, the code; (4) checking, by the analysis and recommendation service computer program, the code for compliance with the rules or control patterns; and (5) deploying, by analysis and recommendation service computer program, the code in response to the code being in compliance.

10 Claims, 4 Drawing Sheets

(56) References Cited

U.S. PATENT DOCUMENTS

| | | | | |
|---|---|---|---|---|
| 10,491,536 B2* | 11/2019 | Shear | | H04L 63/10 |
| 10,810,110 B1* | 10/2020 | Thomas | | G06F 11/3664 |
| 11,429,350 B1* | 8/2022 | Venkatachalam | | G06F 8/70 |
| 11,429,365 B2* | 8/2022 | Gass | | G06F 8/61 |
| 11,467,810 B2* | 10/2022 | Johnson | | G06F 11/3676 |
| 11,587,013 B2* | 2/2023 | Honrao | | G06Q 10/06395 |
| 11,886,434 B1* | 1/2024 | Magnuson | | G06F 9/44505 |
| 11,914,993 B1* | 2/2024 | Garg | | G06F 8/77 |
| 11,947,946 B1* | 4/2024 | Rao | | G06N 20/20 |
| 12,061,903 B2* | 8/2024 | Fanning | | G06F 8/77 |

OTHER PUBLICATIONS

Abualhaija et al., "COREQQA: A Compliance REQuirements Understanding using Question Answering Tool", ACM, pp. 1-5 (Year: 2022).*

Haag et al, "Quality Function Deployment Usage in Software Development", ACM, pp. 1-9 (Year: 1996).*

Falazi et al, "Compliance Management of IaC-Based Cloud Deployments During Runtime", ACM, pp. (Year: 2023).*

Arshad et al, "A Comprehensive Framework for Intelligent, Scalable, and Performance-Optimized Software Development", IEEE, pp. 1-16 (Year: 2024).*

García-Galán et al, "Towards Adaptive Compliance", ACM, pp. 1-7 (Year: 2016).*

* cited by examiner

SYSTEMS AND METHODS FOR IMPROVING EFFICIENCY AND CONTROL COMPLIANCE ACROSS SOFTWARE DEVELOPMENT LIFE CYCLES USING DOMAIN-SPECIFIC CONTROLS

RELATED APPLICATIONS

This application claims priority to, and the benefit of, U.S. Provisional Patent Application Ser. No. 63/369,118, filed Jul. 22, 2022, the disclosure of which is hereby incorporated, by reference, in its entirety.

BACKGROUND OF THE INVENTION

1. Field of the Invention

Embodiments generally relate to systems and methods for improving efficiency and control compliance across software development life cycles using domain-specific controls.

2. Description of the Related Art

Software Development is a complex task, and every year, more and more is expected from technologists every year. Compliance with an organization's software control measures is a daunting task, even for experienced developers. For example, identity and access management systems track what applications are registered to use what Identity and Access Management (IAM) systems. The analysis is often performed at runtime, where evidence is gathered/captured through taking screenshots of the runtime environment or behavior of the system under review.

SUMMARY OF THE INVENTION

Systems and methods for improving efficiency and control compliance across software development life cycles using domain-specific controls are disclosed. In one embodiment, a method may include: (1) receiving, by an analysis and recommendation service computer program, an identification of a domain for code; (2) identifying, by the analysis and recommendation service computer program, rules and/or control patterns for the domain; (3) receiving, by the analysis and recommendation service computer program, the code; (4) checking, by the analysis and recommendation service computer program, the code for compliance with the rules or control patterns; and (5) deploying, by analysis and recommendation service computer program, the code in response to the code being in compliance.

In one embodiment, the method may also include: determining, by the analysis and recommendation service computer program, that the code is not in compliance; identifying, by the analysis and recommendation service computer program, a recommendation for the code to comply to with the rules or control patterns; enriching, by the analysis and recommendation service computer program, the code by incorporating the recommendation into the code; and deploying, by the analysis and recommendation service computer program, the code.

In one embodiment, the code may be enriched using a large language model.

In one embodiment, the code may be enriched using a set of deterministic rules.

In one embodiment, the domain may be identified based on a context of the code.

In one embodiment, the domain may include a web security domain, an identity and access management domain, a resiliency domain, a recovery domain a computer network domain, etc.

In one embodiment, the analysis and recommendation service computer program checks the code for compliance with the rules or control patterns by: extracting features from the code; generating labels for each of the features; and classifying the labeled features as compliant or non-compliant.

In one embodiment, the method may also include applying, by the analysis and recommendation service computer program, behavioral driven design tests to the code.

In one embodiment, the method may also include identifying, by the analysis and recommendation service computer program, additional domains impacted by the domain.

According to another embodiment, a method for improving efficiency and control compliance across software development life cycles using domain-specific controls may include: (1) receiving, by an analysis and recommendation service computer program, an identification of a domain for code; (2) retrieving, by the analysis and recommendation service computer program, a control pattern for the domain; (3) receiving, by the analysis and recommendation service computer program, the code; (4) enriching, by the analysis and recommendation service computer program, the code by applying the control pattern to the code; (5) checking, by the analysis and recommendation service computer program, the code for compliance with the control pattern; and (6) deploying, by the analysis and recommendation service computer program, the code in response to the code being in compliance.

In one embodiment, the code may be enriched using a large language model.

In one embodiment, the code may be enriched using a set of deterministic rules.

In one embodiment, the domain may include a web security domain, an identity and access management domain, a resiliency domain, a recovery domain, and/or a computer network domain.

In one embodiment, the analysis and recommendation service computer program checks the code for compliance with the control pattern by: extracting features from the code; generating labels for each of the features; and classifying the labeled features as compliant or non-compliant.

In one embodiment, the method may also include applying, by the analysis and recommendation service computer program, behavioral driven design tests to the code.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
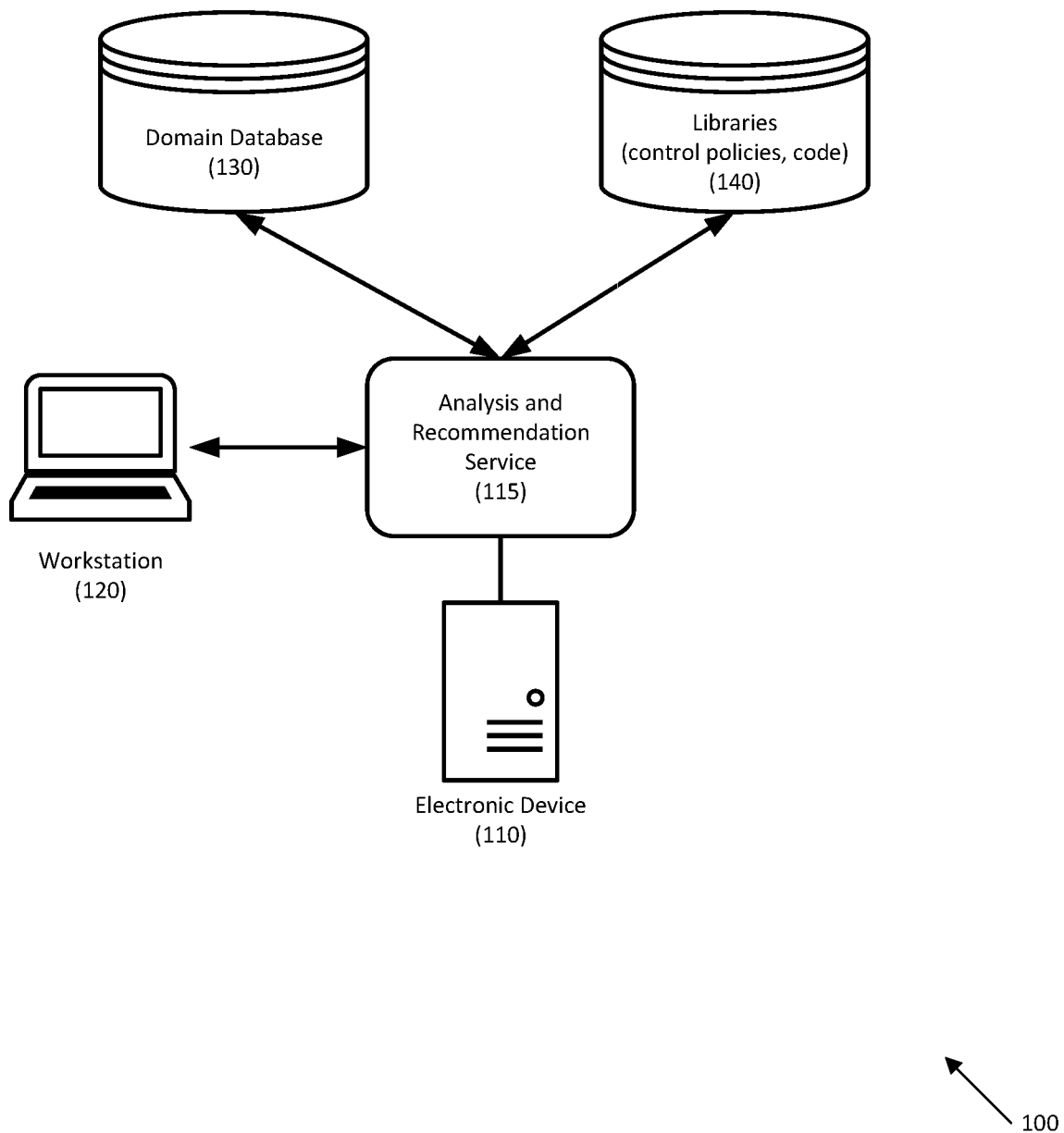
FIG. 1 depicts a system for improving efficiency and control compliance across software development life cycles using domain-specific controls according to an embodiment.

Embodiments generally relate to systems and methods for improving efficiency and control compliance across software development life cycle (SDLC) using domain-specific controls.

Embodiments may use machine learning to analyze at the code level and/or the configuration level, and embodiments may provide recommendations at both the code level and the configuration level. In order to make the right recommendation, the recommendation may be based on the context, which may be driven through the domain, language and other environmental aspects.

Embodiments may include two main subsystems—a compliance adherence detection system and a recommendation subsystem. The compliance adherence subsystem may: a) provide better clarity in what is required to be compliant with the organization's technology and risk controls, which may remove the need for developers to interpret the associated control requirements in isolation; b) remove the need for developers to provide evidence for software adherence to the controls, as compliance will be determined through discovery; c) determine if implemented software complies with a set of approved control patterns; and d) determine if a software system should be subjected to additional controls, such as penetration testing.

The recommendation subsystem may: a) recommend, at the code level and configuration, a software implementation or snippet, based on the existing implementation or an intended outcome and in the manner that the solution is intended to be implemented; b) reduce the number of vulnerabilities (that are introduced during the development phase thereby ultimately reducing the risk profile of the application software; c) perform "learning in the flow" where learning material is at the "micro" learning level and providing the learning material that may be relevant to any remediation or recommendation that was offered; d) link the relationship between the organization's technology risk and control patterns and software; e) remove the need for developers to search the Internet for a solution for known control patterns, and prevent bad solutions or anti-patterns being implemented in the software; f) share quality solutions across teams, as this provides a way for experienced developers to show less-skilled developers what to do, in terms of best practices and satisfying standards, rules, and controls; g) ensure existing control domains still maintain ownership of their domain, even though contributions may be federated out; h) allow software to be written with the required level of quality within the internal development environment (IDE), rather than waiting for the SDLC toolchain to identify issues to be resolved; and i) provide an integrated platform that brings together the different components of managed engineering, such as blueprints and tech primers.

For application owners, embodiments may: a) make it easier to identify issues, manage this associated risk and improve time to market; and b) determine if a software system should be subjected to additional controls, such as penetration testing.

For Information Risk and Security Managers, embodiments may: a) make it easier to identify and manage the associated risk profile of an application; and b) minimize the number of breaks that will need to be managed.

For Software Engineers, embodiments may: a) provide better clarity in what is required to be compliant with the organization's technology and risk controls, thereby removing the need for developers to interpret the associated control requirements; b) remove the need for developers to provide evidence for software adheres to the controls, as compliance may be determined through discovery; and c) determine if implemented software complies with a set of approved control patterns.

For Domain Owners, embodiments may allow for domain's set of controls to be better understood and remove confusion.

Referring to FIG. 1, a system for improving efficiency and control compliance across software development life cycles using domain-specific controls is disclosed according to an embodiment. System 100 may include electronic device 110, such as a server (e.g., physical server and/or cloud-based server) that executed a computer program, such as analysis and recommendation service 115. Analysis and recommendation service may interface with workstation 120 that may be used by a user (e.g., a developer) to write code, or to retrieve code from library 140. Analysis and recommendation service 115 may further interact with domain database 130, which may store information on a plurality of domains for which the domain's controls may be applied to the code. Analysis and recommendation service 115 may also interact with one or more libraries 140, such as a rule library, a code library or repository, etc.

Analysis and recommendation service 115 may review code entered from workstation 120 and/or retrieved from libraries 140, and may check the code for compliance against a set of rules and their objectives, and, against a set of best practices and standards for one or more domain, such as an organization's published API Standards. For example, where IAM is a domain within the compliance sphere, but RESTful API Standards is a domain within the Standards sphere. It may then provide recommendations for fixing code or coding recommendations, etc.

Figure 2:
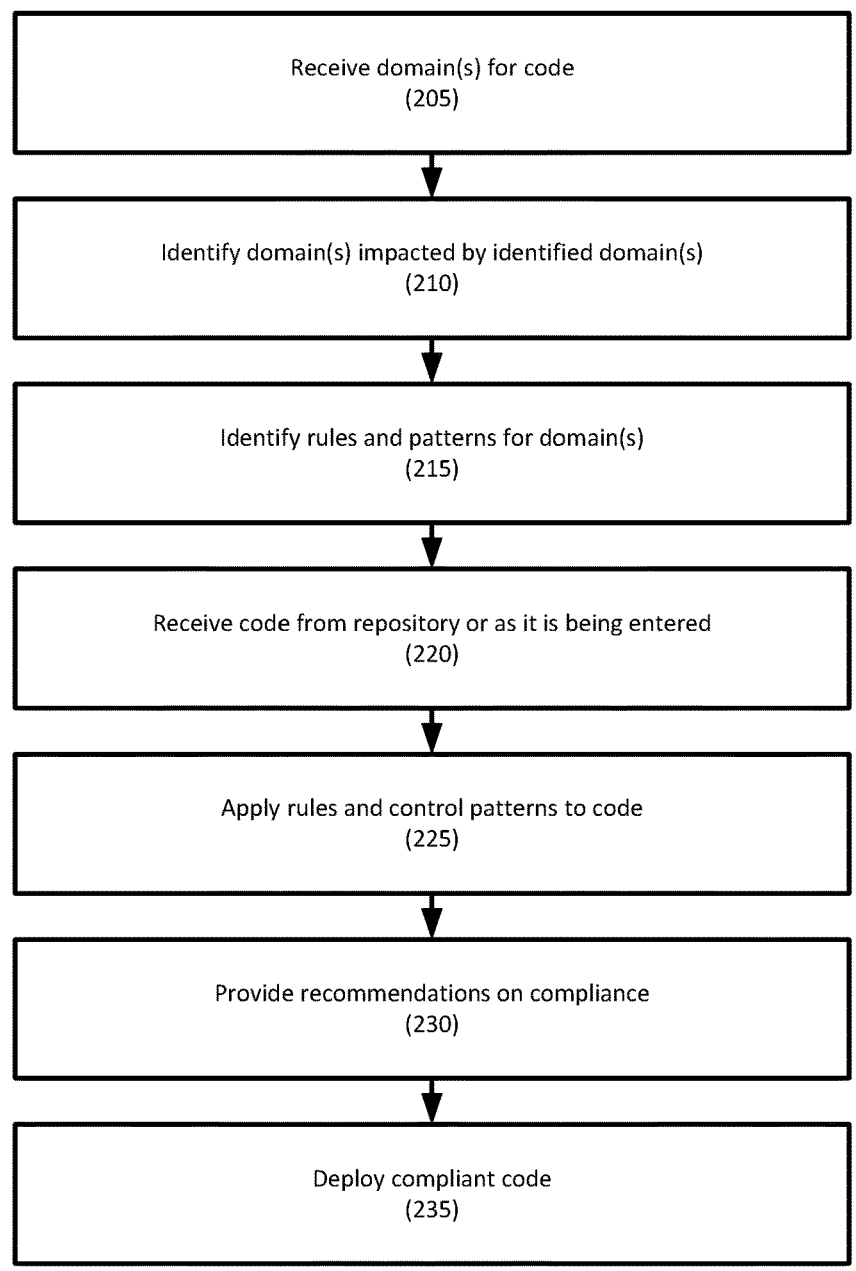
FIG. 2 depicts a method for improving efficiency and control compliance across software development life cycles using domain-specific controls according an embodiment.

Referring to FIG. 2, a method for code compliance verification is disclosed according to an embodiment. In one embodiment, a user, such as a developer, may wish to test code to determine if the code is compliant with rules and pattern for one or more domains, such as a control domain. A control domain may have control procedures associated with it and may be written in an outcome-based approach. For example, if the control domain is Identity and Access Management, a control procedure for that control domain may mandate that web resources are appropriately and securely protected. This control procedure, however, may be represented with an intended outcome that ensures unauthorized access to any of its web resources is not permissible.

Other examples of domains may include Web Security, REST API Standards, OSS Vulnerabilities, Identity and Access Management, Resiliency, Recoverability, business domains, geographical domains, jurisdictional domains, computer network domains, energy domains, etc. These domains are exemplary only and other and different domains may be used as is necessary and/or desired.

In step 205, a computer program, such as an analysis and recommendation service, may receive an identification of one or more domains with controls that will be applied to the code, such as control domains. In one embodiment, the domains may be manually entered; in another embodiment, the analysis and recommendation service may identify the domains by reviewing the code and any project details to identify the context in order to identify the domains. In still another embodiment, the analysis and recommendation service may identify the code based on historical data using machine learning.

In step 210, the analysis and recommendation service may identify any other domains that may be impacted by the identified domains. In one embodiment, there may be multiple domains within software development, software deployment, operational activities, and it is to be expected that a change in one domain may have an impact on another. This may be detected through the representation of the world as an inter-dependent/inter-woven "graph."

In step 215, the analysis and recommendation service may identify a software or configuration relating to the domain(s), which may be a rule, a control pattern, a standard, etc. In one embodiment, the rules may be written in a domain-specific language for each domain.

Rules may document a set of non-functional requirements that may apply, including best practices, development standards, control patterns, and risk management.

In one embodiment, control patterns may be grouped and codified according to their respective control domain. Control patterns may provide a possible architectural solution for a capability or a rule requirement.

In one embodiment, control patterns may represented as a set of rules, representing controls or a policy (e.g., RETE, Open Policy Agent (OPA), etc.).

In step 220, the analysis and recommendation service may receive the code to check for compliance or to provide a recommendation for from the repository, or may receive the code as it is being entered.

In step 225, the analysis and recommendation service may apply the control patterns to the code. For example, the analysis and recommendation service may call an API service to check if the code is compliant with the control pattern.

In one embodiment, the analysis and recommendation service may extract features from the code and may represent the code as features (e.g., code embeddings from a deep learning model, abstract syntax trees, etc.). It may then apply a label generator (e.g., a pseudo-label generator such as Snorkel) to the features to indicate compliance or non-compliance. The machine learning engine may be trained on these features and labels and used to predict whether code is complaint or not compliant.

In one embodiment, analysis and recommendation service may apply code embedding and retrieval using embeddings from a database of accepted rule and control pattern templates, learning materials, etc. Using the output of the retrieval, the analysis and recommendation service may use the retrieved rules and learning materials to determine code changes needed for compliance.

In one embodiment, a compliance report may be sent back with the a level of compliance of the code. This may include the number of and the specific checks from the controls or policy compliance checking service.

In one embodiment, behavioral driven design tests may be run if the response is greater than a certain threshold e.g., if a certain number of checks pass then the code is complaint.

In step 230, the analysis and recommendation service may provide recommendations to the developer. For example, the analysis and recommendation service may recommend certain code to comply with the control patterns. As another example, the analysis and recommendation service may predict, based on code that has been entered, code that will be needed and may identify the code for the programmer. As yet another example, the analysis and recommendation service may automatically apply any code fixes to non-compliant code.

The code changes may be automatically incorporated into the code, by, for example, using a large language model (LLM) to change the code, by using a set of deterministic rules based on re-writing the code's AST tree, etc.

In step 235, the analysis and recommendation service may deploy the compliant code.

In one embodiment, code that is recommended may either be automatically integrated into the software repository or presented to a user to review and accept the recommendation.

In one embodiment, the recommendation and acceptance of the recommendation may be performed in a safe space, such as a new "branch" within the source code management system.

Figure 3:
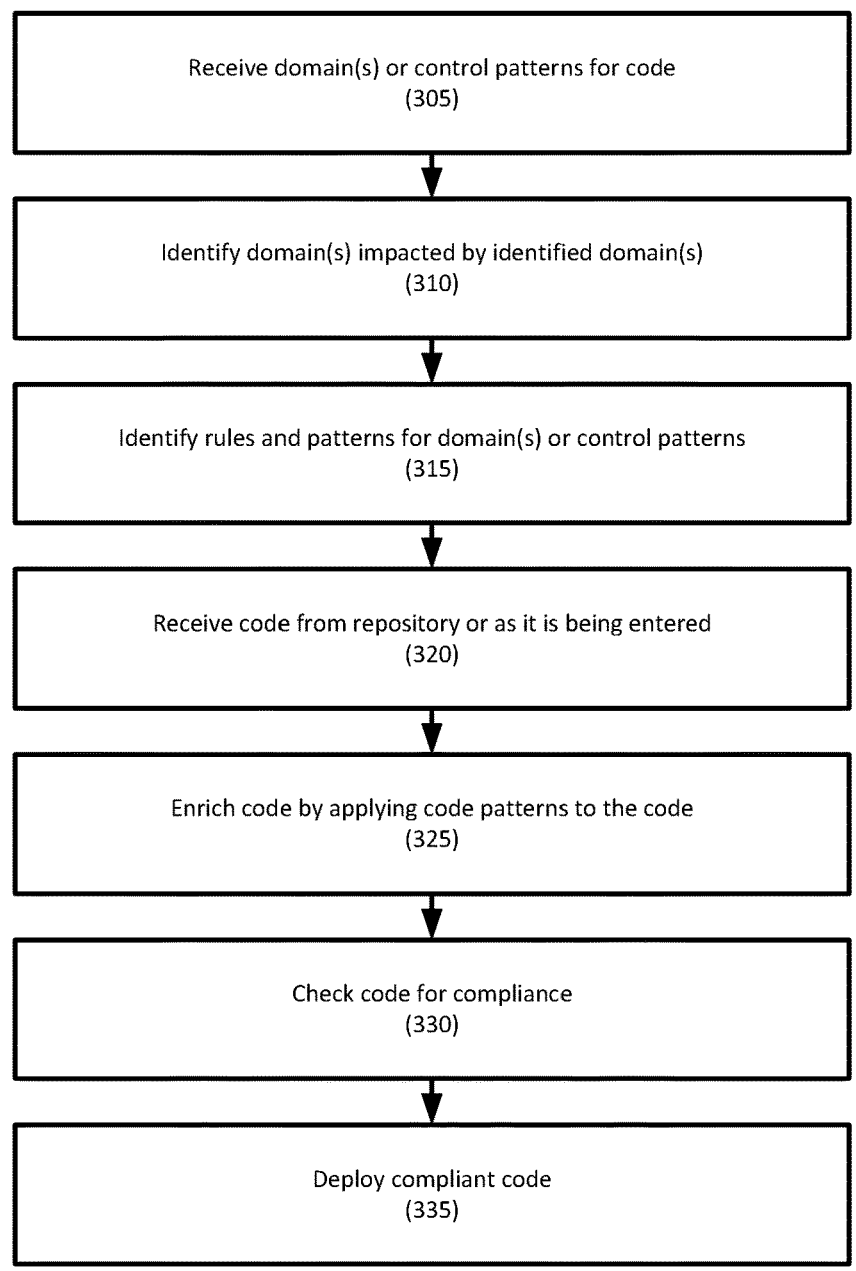
FIG. 3 depicts a method for code recommendation according to an embodiment.

Referring to FIG. 3, a method for code recommendation is disclosed according to an embodiment. For example, a user, such as a developer, may request a recommendation for a code snippet that is compliant with the rules and patterns for one or more domains to incorporate into the code. The developer may request that the analysis and recommendation service review the code and provide recommendations for code snippets to include, or the developer may identify a particular domain or control pattern for the analysis and recommendation service to identify code snippets.

In step 305, a computer program, such as an analysis and recommendation service, may receive an identification of one or more domains having controls that will be applied to the code, such as control domains. In one embodiment, the user may enter a domain or a specific control pattern to apply to code. For example, the developer may specify a domain that the user is interested in, such as "OAuth," and the analysis and recommendation service may identify control patterns associated with that search.

In another embodiment, the analysis and recommendation service autonomously identity the domains based on the context. The analysis and recommendation service may identify the domain using a guided, a pre-configured approach.

In step 310, the analysis and recommendation service may identify any other domains that may be impacted by the identified domains. This may be similar to step 210, above.

In step 315, the analysis and recommendation service may retrieve rules or control patterns as requested.

In step 320, the analysis and recommendation service may receive the code from the repository, or may receive the code as it is being entered.

In step 325, the analysis and recommendation service may enrich the code by applying the control patterns to the code. For example, the analysis and recommendation service may use a large language model or a rules-engine to enrich the code with the implementation of the control pattern.

In step 330, the enriched code may be checked for compliance so that the code will pass all of the compliance checks from the compliance checker. In one embodiment, the enriched code may then be checked against the behavioral driven design tests. If the code does not pass then the cycle, the process may be repeated until compliance is met.

In step 335, the analysis and recommendation service may deploy the compliant code.

In one embodiment, code that is recommended may either be automatically integrated into the software repository or presented to a user to review and accept the recommendation.

In one embodiment, the recommendation and acceptance of the recommendation may be performed in a safe space, such as a new "branch" within the source code management system.

Figure 4:
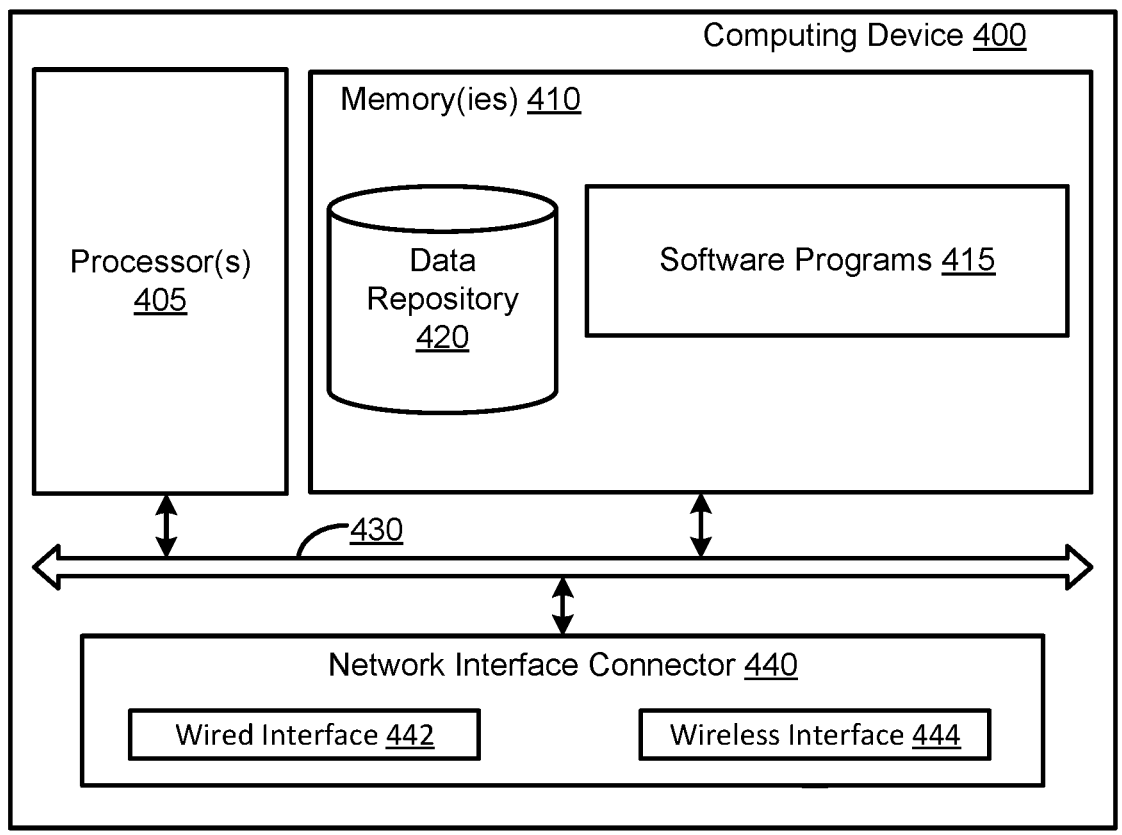
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for improving efficiency and control compliance across software development life cycles using domain-specific controls, comprising:
   receiving, by an analysis and recommendation service computer program, an identification of a deployment domain for code;
   identifying, by the analysis and recommendation service computer program, rules and/or control patterns for the deployment domain;
   receiving, by the analysis and recommendation service computer program, the code;
   checking, by the analysis and recommendation service computer program, the code for compliance with the rules or control patterns;
   determining, by the analysis and recommendation service computer program, that the code is not in compliance with the rules or control patterns;
   identifying, by the analysis and recommendation service computer program, a recommendation for the code to comply to with the rules or control patterns;
   enriching, by the analysis and recommendation service computer program and using a set of deterministic rules, the code by incorporating the recommendation into the code; and
   deploying, by the analysis and recommendation service computer program, the code to the deployment domain.

2. The method of claim 1, wherein the code is further enriched using a large language model.

3. The method of claim 1, wherein the deployment domain is identified based on a context of the code.

4. The method of claim 1, wherein the analysis and recommendation service computer program checks the code for compliance with the rules or control patterns by:
   extracting features from the code;
   generating labels for each of the features; and
   classifying the labeled features as compliant or non-compliant.

5. The method of claim 1, further comprising:
   applying, by the analysis and recommendation service computer program, behavioral driven design tests to the code.

6. The method of claim 1, further comprising:
identifying, by the analysis and recommendation service computer program, additional deployment domains impacted by the deployment domain.

7. A method for improving efficiency and control compliance across software development life cycles using domain-specific controls, comprising:
receiving, by an analysis and recommendation service computer program, an identification of a deployment domain for code;
retrieving, by the analysis and recommendation service computer program, a control pattern for the deployment domain;
receiving, by the analysis and recommendation service computer program, the code;
enriching, by the analysis and recommendation service computer program and using a set of deterministic rules, the code by applying the control pattern to the code;
checking, by the analysis and recommendation service computer program, the code for compliance with the control pattern; and
deploying, by the analysis and recommendation service computer program, the code to the deployment domain in response to the code being in compliance.

8. The method of claim 7, wherein the code is further enriched using a large language model.

9. The method of claim 7, wherein the analysis and recommendation service computer program checks the code for compliance with the control pattern by:
extracting features from the code;
generating labels for each of the features; and
classifying the features as compliant or non-compliant.

10. The method of claim 7, further comprising:
applying, by the analysis and recommendation service computer program, behavioral driven design tests to the code.

* * * * *